US008259075B2

(12) United States Patent  
Gioscia et al.

(10) Patent No.: US 8,259,075 B2
(45) Date of Patent: Sep. 4, 2012

(54) SECONDARY KEY GROUP LAYOUT FOR KEYBOARD (75) Inventors: Richard Gioscia, Santa Clara, CA (US); Matias Duarte, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 690 days.

(21) Appl. No.: 12/463,145

(22) Filed: May 8, 2009

(65) Prior Publication Data

US 2010/0171707 A1    Jul. 8, 2010

Related U.S. Application Data (60) Provisional application No. 61/142,848, filed on Jan. 6, 2009.

(51) Int. Cl.
*G09G 5/00* (2006.01)
(52) U.S. Cl. .......................................... 345/169; 345/168
(58) Field of Classification Search ................. 345/169, 345/173, 168
See application file for complete search history.

(56) References Cited

U.S. PATENT DOCUMENTS

| 3,573,376 | A | 4/1971 | Bartlett et al. |
| 4,545,023 | A | 10/1985 | Mizzi |
| 4,799,254 | A | 1/1989 | Dayton et al. |
| 4,931,783 | A | 6/1990 | Atkinson |
| 4,972,457 | A | 11/1990 | O'Sullivan |
| 5,010,547 | A | 4/1991 | Johnson et al. |
| 5,075,684 | A | 12/1991 | DeLuca |
| 5,127,041 | A | 6/1992 | O'Sullivan |
| RE34,034 | E | 8/1992 | O'Sullivan |
| 5,189,632 | A | 2/1993 | Paajanen et al. |
| 5,249,218 | A | 9/1993 | Sainton |
| 5,335,276 | A | 8/1994 | Thompson et al. |
| 5,353,334 | A | 10/1994 | O'Sullivan |
| 5,367,563 | A | 11/1994 | Sainton |
| D354,478 | S | 1/1995 | Miyahara |
| 5,394,140 | A | 2/1995 | Wong et al. |
| D359,734 | S | 6/1995 | Nagele et al. |
| 5,430,436 | A | 7/1995 | Fennell |
| 5,436,960 | A | 7/1995 | Campana, Jr. et al. |
| 5,438,611 | A | 8/1995 | Campana, Jr. et al. |
| 5,446,759 | A | 8/1995 | Campana, Jr. et al. |

(Continued)

FOREIGN PATENT DOCUMENTS

CA    2187050    5/1997

(Continued)

OTHER PUBLICATIONS

U.S. Appl. No. 07/831,671.

(Continued)

*Primary Examiner* — Kevin M Nguyen (57) ABSTRACT

A configuration for layout of keys of a keyboard is provided. The keyboard configuration includes a set of keys having a first character value and a second character value. The set of keys is configured in a layout in which a row of keys has consecutive characters corresponding to the first character value, for example, 'Q', 'W', 'E', 'R', 'T', and 'Y.' The second character values on the keys are grouped according to one of a plurality of groupings. Each grouping of the plurality of groupings comprises adjacent keys of the plurality of keys. The plurality of groupings is distributed across the keyboard, for example, in different zones. The groupings include, for example, mathematical operands, punctuations, and numerals. A symbol key can toggle a key between the first character value and the second character value.

18 Claims, 4 Drawing Sheets

U.S. PATENT DOCUMENTS

| | | | |
|---|---|---|---|
| 5,479,472 | A | 12/1995 | Campana, Jr. et al. |
| 5,485,373 | A | 1/1996 | Davis et al. |
| 5,496,992 | A | 3/1996 | Madan et al. |
| 5,550,715 | A | 8/1996 | Hawkins |
| 5,584,054 | A | 12/1996 | Tyneski et al. |
| 5,594,640 | A | 1/1997 | Capps et al. |
| 5,612,682 | A | 3/1997 | DeLuca et al. |
| 5,625,670 | A | 4/1997 | Campana, Jr. et al. |
| 5,631,946 | A | 5/1997 | Campana, Jr. et al. |
| 5,640,146 | A | 6/1997 | Campana, Jr. et al. |
| 5,640,444 | A | 6/1997 | O'Sullivan |
| 5,650,769 | A | 7/1997 | Campana, Jr. et al. |
| 5,650,776 | A | 7/1997 | Mitchell et al. |
| D385,875 | S | 11/1997 | Harris et al. |
| D386,497 | S | 11/1997 | Huslig et al. |
| 5,694,428 | A | 12/1997 | Campana, Jr. et al. |
| 5,710,798 | A | 1/1998 | Campana, Jr. et al. |
| 5,714,937 | A | 2/1998 | Campana, Jr. et al. |
| 5,717,725 | A | 2/1998 | Campana, Jr. et al. |
| 5,722,059 | A | 2/1998 | Campana, Jr. et al. |
| 5,722,064 | A | 2/1998 | Campana, Jr. et al. |
| D393,856 | S | 4/1998 | Lee et al. |
| 5,742,644 | A | 4/1998 | Campana, Jr. et al. |
| 5,745,532 | A | 4/1998 | Campana, Jr. et al. |
| 5,751,773 | A | 5/1998 | Campana, Jr. et al. |
| D395,300 | S | 6/1998 | Yamazaki et al. |
| 5,761,621 | A | 6/1998 | Sainton |
| 5,797,089 | A | 8/1998 | Nguyen |
| 5,797,098 | A | 8/1998 | Schroeder et al. |
| 5,798,759 | A | 8/1998 | Dahl |
| 5,805,633 | A | 9/1998 | Uddenfeldt |
| 5,812,117 | A | 9/1998 | Moon |
| 5,819,172 | A | 10/1998 | Campana, Jr. et al. |
| 5,825,675 | A | 10/1998 | Want et al. |
| 5,854,985 | A | 12/1998 | Sainton et al. |
| 5,864,805 | A | 1/1999 | Chen et al. |
| 5,884,323 | A | 3/1999 | Hawkins et al. |
| D408,021 | S | 4/1999 | Haitani et al. |
| D408,030 | S | 4/1999 | Richards et al. |
| D409,185 | S | 5/1999 | Kawashima |
| D410,486 | S | 6/1999 | Takahata et al. |
| 5,926,170 | A | 7/1999 | Oba |
| 5,938,772 | A | 8/1999 | Welch |
| 5,949,408 | A | 9/1999 | Kang et al. |
| 5,958,006 | A | 9/1999 | Eggleston et al. |
| D416,001 | S | 11/1999 | Tal et al. |
| D416,256 | S | 11/1999 | Griffin et al. |
| 5,983,073 | A | 11/1999 | Ditzik |
| 5,990,872 | A | 11/1999 | Jorgenson et al. |
| 6,000,000 | A | 12/1999 | Hawkins et al. |
| 6,005,496 | A | 12/1999 | Hargreaves et al. |
| 6,006,274 | A | 12/1999 | Hawkins et al. |
| 6,022,156 | A | 2/2000 | Blish |
| D421,744 | S | 3/2000 | Ono |
| 6,043,760 | A | 3/2000 | Laakkonen |
| D423,468 | S | 4/2000 | Jenkins |
| 6,049,796 | A | 4/2000 | Siitonen et al. |
| 6,052,735 | A | 4/2000 | Ulrich et al. |
| 6,058,304 | A | 5/2000 | Callaghan et al. |
| 6,067,451 | A | 5/2000 | Campana, Jr. et al. |
| D432,099 | S | 10/2000 | Loh et al. |
| D432,535 | S | 10/2000 | Loh et al. |
| D433,016 | S | 10/2000 | Matsuda et al. |
| 6,134,453 | A | 10/2000 | Sainton et al. |
| 6,141,540 | A | 10/2000 | Richards et al. |
| 6,157,630 | A | 12/2000 | Adler et al. |
| 6,160,926 | A | 12/2000 | Dow et al. |
| 6,169,485 | B1 | 1/2001 | Campana, Jr. et al. |
| 6,188,789 | B1 | 2/2001 | Marianetti, II et al. |
| D439,232 | S | 3/2001 | Ledingham et al. |
| 6,198,783 | B1 | 3/2001 | Campana, Jr. et al. |
| 6,204,848 | B1 | 3/2001 | Nowlan et al. |
| RE37,141 | E | 4/2001 | O'Sullivan |
| D440,959 | S | 4/2001 | Wolf et al. |
| 6,219,694 | B1 | 4/2001 | Lazaridis et al. |
| D442,156 | S | 5/2001 | Lee |
| D443,865 | S | 6/2001 | Kim |
| D446,199 | S | 8/2001 | Xu et al. |
| 6,272,190 | B1 | 8/2001 | Campana, Jr. et al. |
| 6,278,442 | B1 | 8/2001 | Griffin et al. |
| 6,295,460 | B1 | 9/2001 | Nagel et al. |
| 6,297,795 | B1 | 10/2001 | Kato et al. |
| 6,310,926 | B1 | 10/2001 | Tore |
| D450,307 | S | 11/2001 | Xu et al. |
| 6,317,592 | B1 | 11/2001 | Campana, Jr. et al. |
| 6,330,618 | B1 | 12/2001 | Hawkins et al. |
| D454,349 | S | 3/2002 | Makidera et al. |
| D455,135 | S | 4/2002 | Hyun |
| 6,377,685 | B1 | 4/2002 | Krishnan |
| D456,805 | S | 5/2002 | Ono et al. |
| 6,396,482 | B1 | 5/2002 | Griffin et al. |
| 6,397,078 | B1 | 5/2002 | Kim |
| 6,421,707 | B1 | 7/2002 | Miller et al. |
| 6,452,588 | B2 | 9/2002 | Griffin et al. |
| 6,477,482 | B1 | 11/2002 | Maupin et al. |
| 6,489,950 | B1 | 12/2002 | Griffin et al. |
| 6,587,132 | B1 | 7/2003 | Smethers |
| 6,611,254 | B1 | 8/2003 | Griffin et al. |
| 6,611,255 | B2 | 8/2003 | Griffin et al. |
| 6,611,697 | B1 | 8/2003 | Ewing et al. |
| 6,662,244 | B1 | 12/2003 | Takahashi |
| 6,665,173 | B2 | 12/2003 | Brandenberg et al. |
| 6,725,060 | B1 | 4/2004 | Chhatriwala et al. |
| 6,728,786 | B2 | 4/2004 | Hawkins et al. |
| 6,857,105 | B1 | 2/2005 | Fox et al. |
| 6,867,763 | B2 | 3/2005 | Griffin et al. |
| 6,873,317 | B1 | 3/2005 | Griffin et al. |
| 6,874,011 | B1 | 3/2005 | Spielman et al. |
| 6,891,529 | B2 | 5/2005 | Ladouceur et al. |
| 6,919,879 | B2 | 7/2005 | Griffin et al. |
| 6,934,558 | B1 | 8/2005 | Sainton et al. |
| 6,957,397 | B1 | 10/2005 | Hawkins |
| 6,961,584 | B2 | 11/2005 | Leedom, Jr. |
| 7,054,441 | B2 | 5/2006 | Pletikosa |
| 7,061,403 | B2 | 6/2006 | Fux |
| 7,136,897 | B1 | 11/2006 | Raghunandan |
| RE39,427 | E | 12/2006 | O'Sullivan |
| 7,155,521 | B2 | 12/2006 | Lahti et al. |
| 7,356,361 | B1 | 4/2008 | Hawkins et al. |
| 2001/0027121 | A1 | 10/2001 | Boesen |
| 2002/0036623 | A1 | 3/2002 | Kano |
| 2002/0058533 | A1 | 5/2002 | Nagel et al. |
| 2002/0063738 | A1 | 5/2002 | Chung |
| 2002/0086702 | A1 | 7/2002 | Lai et al. |
| 2002/0090934 | A1 | 7/2002 | Mitchelmore |
| 2002/0097227 | A1 | 7/2002 | Chu et al. |
| 2003/0123627 | A1 | 7/2003 | Pinard et al. |
| 2004/0047505 | A1 | 3/2004 | Ghassabian |
| 2008/0076487 | A1* | 3/2008 | van der Meulen ......... 455/575.1 |
| 2009/0154682 | A1* | 6/2009 | Qiu ........................ 379/216.01 |
| 2009/0231282 | A1* | 9/2009 | Fyke ........................... 345/173 |

FOREIGN PATENT DOCUMENTS

| | | |
|---|---|---|
| EP | 0 149 762 | 7/1985 |
| EP | 0 813 328 A2 | 12/1997 |
| EP | 0 840 934 B1 | 4/1999 |
| EP | 933908 A2 | 8/1999 |
| EP | 1071029 A2 | 1/2001 |
| EP | 1218814 B1 | 4/2003 |
| WO | WO 94/10678 A1 | 5/1994 |
| WO | WO 94/16408 A1 | 7/1994 |
| WO | WO 96/01453 A1 | 1/1996 |
| WO | WO 00/65445 A1 | 11/2000 |
| WO | WO 01/18638 A1 | 3/2001 |

OTHER PUBLICATIONS

U.S. Appl. No. 09/670,696.
U.S. Appl. No. 09/813,165.
U.S. Appl. No. 09/835,464.
U.S. Appl. No. 09/953,211.
Basterfield, D., "The IBM PalmTop PC110," Jan. 30, 2000, pp. 1-3.
Blackberry Handheld Installation & Getting Started Guide, © 2002 Copyright by Research in Motion Limited, 295 Philip Street, Waterloo, Ontario, Canada N2L 3W8. Revised Feb. 27, 2003, pp. 39-41. (www.rim.net).
BlackBerry Handheld Users Guide, Sep. 7, 1999.

BlackBerry Developer's Guide SDK User's Guide Version 2.0 (Data TAC), Jun. 12, 2000.
BlackBerry Desktop Software Installation and Getting Started Guide, Feb. 5, 1999.
BlackBerry Enterprise Server Software Installation and Getting Started Guide, Sep. 29, 1999.
Compaq Product Information, *IPAQ Pocket PC Options*, [retrieved Nov. 13, 2001], retrieved from internet: www.compaq.com/products/handhelds,.
Choi, H., *First Look: Samsung I300 Cellphone/PDA*, retrieved from internet www.techtv.com, Mar. 28, 2001.
Di Sabatino, J., "Hands Full of Information," Computerworld, Nov. 6, 2000, p. 68.
Filing of translation of European Patent (UK) under Section 77(6)(a), European patent No. 1218814, Apr. 9, 2003, 13 pages.
Handspring Product Information: *VisorPhone The Springboard Module that Transforms your Visor into an Extraordinary Phone*, (2000).
Handspring, *Sprint and Airprime Delivery First Wireless CDMA Phone and Data Module for the Handspring Visor*, [retrieved Aug. 6, 2001], retrieved from internet www.handspring/pr59.jhtml.
Handspring VisorPhone Module User Guide, (2000-2001).
IBM Technical Disclosure Bulletin: *SimpleUser Interface to a Cellular Telephone*, Oct. 1995, pp. 349-350, [retrieved Jul. 5, 2001], retrieved from internet.
IBM Technical Disclosure Bulletin: *Inexpensive Personal Digital Assistant*, Apr. 1995, pp. 525-526, [retrieved Jul. 5, 2001], retrieved from internet.
Kyocera's Smartphone Series, retrieved from internet www.kyocera-wireless.com, 2001.
Microsoft, "The Windows Interface an Application Design Guide," 1987, pp. 84-87, Figures 1-6.
Mossberg, W., *Samsung Embeds Cellphone Inside Palm in New I300 Device*, Aug. 30, 2001, [retrieved Oct. 26, 2001], retrieved from internet http://www.ptech.wsj.com/archive/ptech-20010830.html.
Motorola Model V100 User's Guide, pp. 1, 2, 17-19, 33.
Motorola Model 009 User's Guide, pp. 1, 3, 22, 23, 80.
Motorola Model 009 "Let's Start" Guide, pp. 1, 3, 11.
Motorola V60i Wireless Phone User Manual, Personal Communications Sector, Motorola, Inc., 600 North U.S. Highway 45, Libertyville, Illinois (www.motorola.com), pp. 1 and 53. url=http://www.motorola.com/mdirect/manuals/v60i_TDMA_User_Manual_E.pdf.
Motorola Series 60g Wireless Phone User Manual, © 2001 Motorola, Inc., published by the Personal Communications Sector, 600 North U.S. Highway 45, Libertyville, Illinois (www.motorola.com), pp. 1-3.
Newspaper Article: *Ways to Escape Multiple-Remote Hell*, San Jose Mercury News, Jun. 14, 2001.
Newton MessagePad Handbook, © 1994 Apple Computer, Inc., 1 Infinite Loop, Cupertiono, CA, pp. 14-19, 22 and 23. (www.apple.com).
Nokia 9110 Accessories Quick Guide Instruction Manual, 1999.
Orubeondo, A., "The New Shape of Mobile Communication," InfoWorld, Apr. 23, 2001, pp. 65-66.
Palencher, J., "New Phones Deliver PIM Function," Twice, Oct. 9, 2000, p. 44.
PCT International Search Report and Written Opinion, PCT Application No. PCT/US2009/067769, Aug. 2, 2010, 9 pages.
Photograph of Motorola 009 from 3GNewsroom.com.
Pinkerton, J., "Wireless Meets Computing Again," Dealerscope, Nov. 2000, pp. 34-35.
Progue, D., "PalmPilot: The Ultimate Guide," O'Reilly, $2^{nd}$ Edition, Chapter 1-4.
Sprint PCS User Guide—Samsung Model SCH-8500, 1999.
SyncML Sync Protocol, version 1.0.1, 2001, pp. 1-61.
SyncML Website Introduction Page, SycnML Initiative LTD., [Retrieved on Oct. 24, 2002]. Retrieved from the Internet: <URL: http://www.syncml.org/about-intro.html>, 2 pages.
SynML Sync Protocol [Retrieved on Dec. 7, 2000]. Retrieved from the Internet: <URL:http://www.syncml.org/docs/syncml_protocol_v10_20001207.pdf>, 60 pages.
SynML Sync Protocol Version 1.0.1 [Retrieved on Jun. 15, 2001]. Retrieved from the Internet: <URL:http://www.syncml.org/docs/syncml_protocol_v101_20010615.pdf>, 61 pages.
Tam, P., "Palm, Motorola to Make PDA Cell Phones", Sep. 25, 2000, [retrieved Jun. 19, 2001], retrieved from internet http://www.zdnet.com/zdnn/stories/news/0,4586,2631800,00.html.
Technical White Paper BlackBerry Enterprise Edition for Microsoft Exchange, Version 2.1, (1999-2001).
Technical White Paper BlackBerry Enterprise Server for Microsoft Exchange, Version 2.1, (1997-2001).
TUCOWS PDA Phone GSM Dailer: GSM Dailer 1.0, Nov. 30, 2000, [retrieved Jun. 19, 2001], retrieved from internet http://pds.rcp.net/pe/pocket/preview 154208.html,.
United States Court of Appeals for the Federal Circuit: *Wireless Agents LLC v. Sony Ericsson Mobile Communications AB and Sony Ericsson Mobile Communications (USA), Inc.*, Decided Jul. 26, 2006, 7 pages.
User's Guide, hp iPAQ Pocket PC h4000 Series, Document Part No. 343434-001, Aug. 2003, 141 pages.
Wireless Application Protocol, Service Loading, WAP-168-ServiceLoad-20011073 l-a, Version Jul. 31, 2001, 18 pages.
Wireless Application Protocol, Service Indication, WAP-167-ServiceInd-20011073 l-a, Version Jul. 31, 2001, 28 pages.
Wireless Application Protocol, Push Message, WAP-251-PushMessage-20010322-a, Version Mar. 22, 2001, 14 pages.
Wireless Application Protocol, WAP-Sync-Spec, Data Synchronisation Specification, WAP-234-SYNC-20010530-a, Version May 30, 2001, 11 pages.
Wireless Application Protocol, Wireless Application Protocol, Wireless Markup Language Specification Version 1.3, WAP WML, WAP-191-WML, Feb. 19, 2000, 110 pages.

* cited by examiner

SECONDARY KEY GROUP LAYOUT FOR KEYBOARD

CROSS REFERENCE TO RELATED APPLICATIONS

This application claims a benefit of, and priority to, U.S. Patent Application Ser. No. 61/142,848, the contents of which is hereby incorporated by reference.

This application is related to U.S. patent application Ser. No. 12/022,834, filed Jan. 30, 2008, and titled "Hand-held Device", the contents of which are hereby incorporated by reference.

BACKGROUND

1. Field of Art

The disclosure generally relates to the field of computing device keyboards, and more particularly, grouping of keys corresponding to symbols.

2. Description of the Related Art

As computing device become more compact in size, the surface area for keyboards continues to decrease. Moreover, the number of keys to represent alphanumeric characters also continues to decrease. For example, keyboards corresponding to the English language characters conventionally were 101 keys and over time have reduced to 35 keys, 30 keys and 15 keys. Even with the smaller number of keys, such keyboards continue to maintain a configuration with Q-W-E-R-T-Y keys of a first of three letter rows (sometimes referred to as a 'QWERTY' keyboard.

A significant problem with a reduction in the number of keys is a corresponding reduction, or complete elimination, of secondary keys available for the user. Secondary keys include punctuation keys, numerical keys, and other symbol keys. Some configuration use software to display secondary keys on a screen for selection by a user when a pre-configured key on the keyboard is selected by that user. However, this configuration requires additional steps and coordination that is inconvenient for the user. Other attempted solutions include placing some secondary keys on the keyboard as separate keys or secondary keys activated through a type of "function" key. However, one problem with this approach is that the keys are not grouped in logical configurations.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Overview

One embodiment of a disclosed system, method and computer readable storage medium that includes a configuration for layout of keys of a keyboard. In one embodiment, a keyboard configuration includes a set of keys having a first character value and second character value. The first character values may be grouped as a set of keys. In one embodiment, this grouping may be a set of keys that are configured in a keyboard layout. For example, the first character values may be within a keyboard having two or more keys in which a row of keys has consecutive characters corresponding to the first language character value of, for example, a language character value of 'Q', 'W', 'E', 'R', 'T', and/or 'Y'. Where these language character values are used, such configuration of keys is referred to as a "QWERTY" keyboard. The principles disclosed herein apply to other language character and configuration keyboard layouts as well, for example, DVORAK layout or QWERTZ layout or AZERTY, but for ease of discussion reference will be made to QWERTY.

Some of the keys of the keyboard also include a second character value. The second character values on the keys are grouped according to one of a plurality of groupings. Each grouping of the plurality of groupings comprising adjacent keys of the plurality of keys. The plurality of groupings is distributed across the keyboard, for example, in different zones. The groupings include, for example, mathematical operands, punctuations, and numerals. In one embodiment a symbol key, the symbol key configured to toggle between the first character value and the second character value of each of the plurality of keys having a first character value and a second character value.

As structured, the disclosed configuration logically groups commonly used character values and operands for ease of access and interaction. In addition, the configurations described also increases the number of functions available for interaction within a limited set of keys as further disclosed herein.

Example Mobile Computing Device

Figure 1:
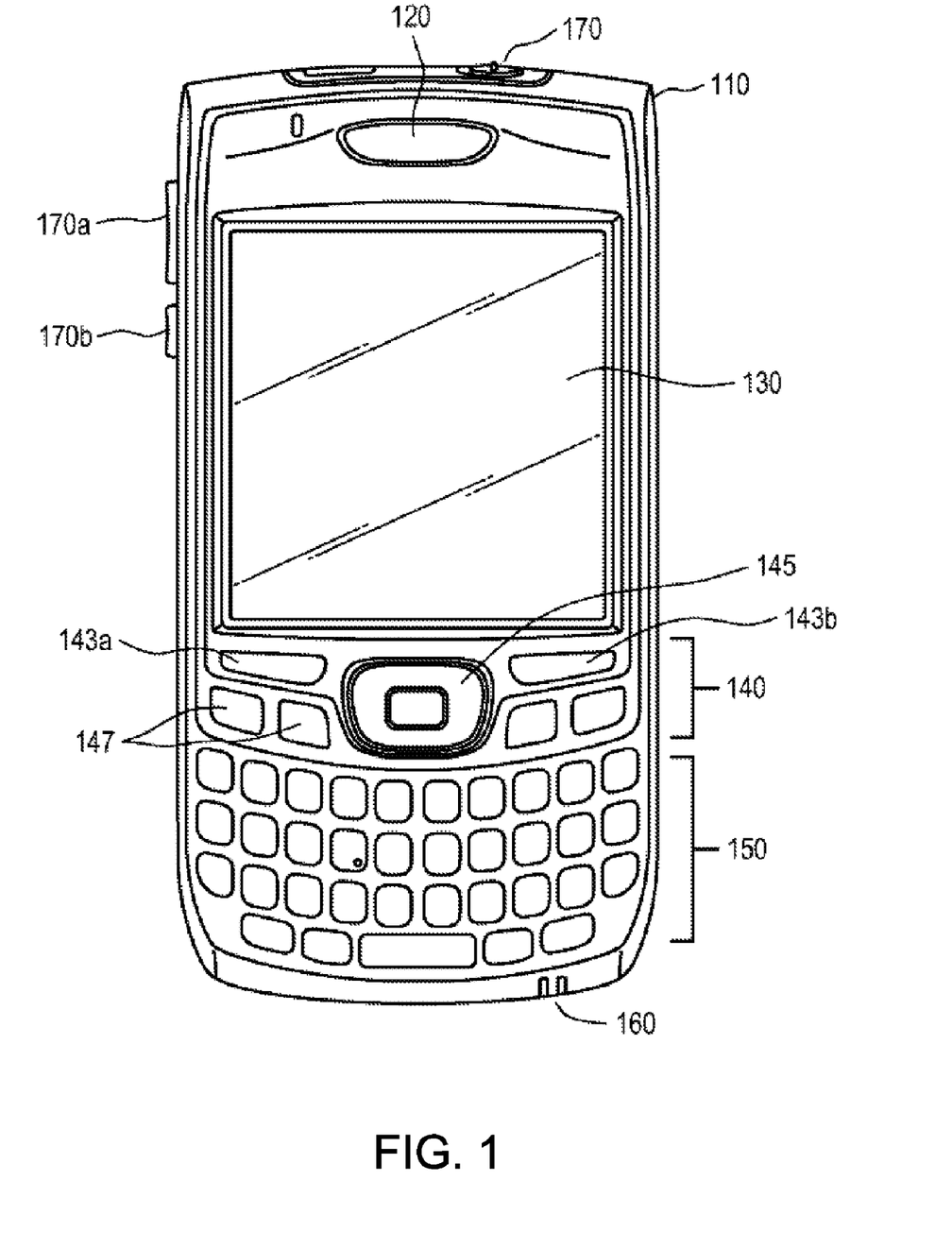
FIG. 1 illustrates one embodiment of a mobile computing device.

FIG. 1 illustrates one embodiment of a mobile computing device 110 with telephonic functionality, e.g., a mobile phone or a smartphone. The mobile computing device 110 is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 12.75 centimeters in width, 0.64 to 2.2 centimeters in height and weigh between 50 and 250 grams.

The mobile computing device 110 includes a speaker 120, a screen 130, a navigation area 140, a keyboard (or keypad area) 150, and a microphone 160. The keyboard 150 comprises a sufficient number of keys to accommodate language characters, e.g., 26 characters of the English language, and some additional characters or functions, e.g., enter, space, or shift. In one embodiment there may be 30 to 35 keys, e.g., one for each letter of the English alphabet plus a few additional keys for characters or functions. The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard). In an alternate embodiment there may be a smaller number of keys, e.g., 15 to 20 keys, in which keys may accommodate two characters by having individual switches under each edge of the key, e.g., a key with 'Q' and 'W' would have an underlying switch corresponding to 'Q' along a left edge and an underlying switch corresponding to 'W' along a right edge. Embodiments of the keyboard are further described below with respect to FIGS. 3A-3C and 4.

The navigation area 140 is configured to control functions of an application executing in the mobile computing device 110 and visible through the screen 130. For example, the navigation area includes an x-way (x is a numerical integer, e.g., 5) navigation ring 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The mobile computing device 110 also may include one or more switches 170, 170a, 170b (generally 170). The one or more switches 170 may be buttons, sliders, or rocker switches and can be mechanical or solid state (e.g., touch sensitive solid state switch). The switches assist with navigation and selection processes with respect to the user interface.

The screen 130 of the mobile computing device 110 is, for example, a 240×240, a 320×320, or a 320×480 transflective display. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

Although not illustrated, it is noted that the mobile computing device 110 also may include an expansion slot. The expansion slot is configured to receive and support expansion cards (or media cards), which may include memory cards such as CompactFlash™ cards, SD cards, XD cards, Memory Sticks™, MultiMediaCard™, SDIO, and the like.

Example Mobile Computing Device Architectural Overview

Figure 2:
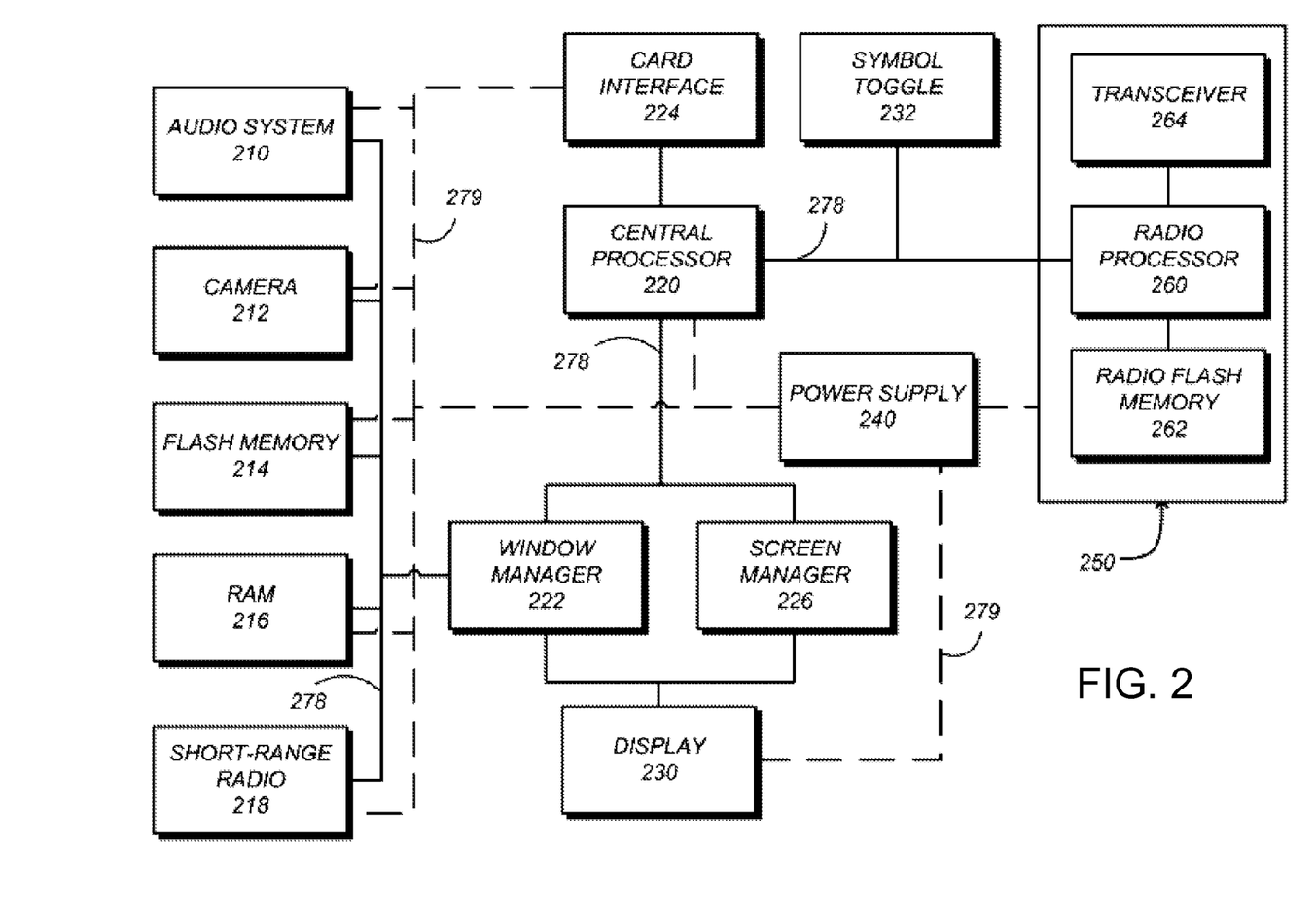
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, RAM memory 216, short range radio module 218 (e.g., Bluetooth, Wireless Fidelity (WiFi) component), a window manager 222, a screen manager 226, and a symbol toggle 232. The central processor communicatively couples these various components or modules (e.g., the window manager 222, the screen manager 226, the symbol toggle 232, the radio subsystem 250, etc.) through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components of the mobile computing device 110 through a power line (or bus) 279.

In one embodiment, the window manager 222 comprises a software or firmware process that initializes a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to modify a window, such as resizing the window, moving the window or any other command altering the appearance or position of the window, and modifies the window accordingly.

The screen manager 226 comprises a software or firmware process that manages content displayed on the screen 130. In one embodiment, the screen manager 226 monitors and controls the physical location of data displayed on the screen 130 and which data is displayed on the screen 130. The screen manager 226 alters or updates the location of data as viewed on the screen 130. The alteration or update is responsive to input from the central processor 220 and display driver 230, which modifies appearances displayed on the screen 130. In one embodiment, the screen manager 226 also monitors and controls screen brightness and transmits control signals to the central processor 220 to modify screen brightness and power usage to the screen 130.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile, High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate with the expansion slot. The card interface 224 transmits data and/or instructions between the central processor and an expansion card or media card included in the expansion slot. The card interface 224 also transmits control signals from the central processor 220 to the expansion slot to configure an expansion card or media card included in the expansion slot.

The symbol toggle 232 is configured to toggle a character of a key on the keyboard 150. One or more keys of the keyboard 150 are configured to have at least a first character value and a second character value. For example, a first character value may be a letter, for example, 'Q', 'W', 'E', 'R', 'T', or 'Y' and the second character value may be a '/', '+', '1', '2', '3', 'or '%', respectively. The symbol toggle 232 is configured to receive a signal from a key on the keyboard, e.g., a symbol or "SYM" key. The received signal is translated to one or more instructions that activate one or more states, e.g., first state, a second state, a third state and a fourth state. Each state corresponds to the value of one or more keys. For example, a default for all keys of the keyboard is the first character value. When the symbol key is selected and the symbol toggle 232 determines how many times the symbol key is selected. Each consecutive selection corresponds to a particular state. In such an example, a single selection is the second state, which corresponds to the subsequent selection of a key on the keyboard 150 to be the second character value and then revert to the first character value after such selection. Twice (consecutive) selection of the symbol key may be a "key lock" so that all second character values of the keys of the keyboard 150 are active until the symbol key is selected again. In some embodiments where more than two characters are present with respect to a key, a thrice (consecutive) selection of the symbol key may be configured to activate those additional character values.

In one embodiment, signals from the symbol toggle 232 and other components are forwarded to the central processor 220. The central processor 220 receives the signals and executes appropriate logic (by way of programming, code, instructions) corresponding to executing applications interfaced through, for example, symbol logic 232, the navigation area 140 or switches 170. It is noted that numerous other components and variations are possible to the hardware architecture of the computing device 200, thus an embodiment such as shown by FIG. 2 is just illustrative of one implementation for an embodiment.

Key Layout for Keyboard

Figures 3A, 3B, 3C:
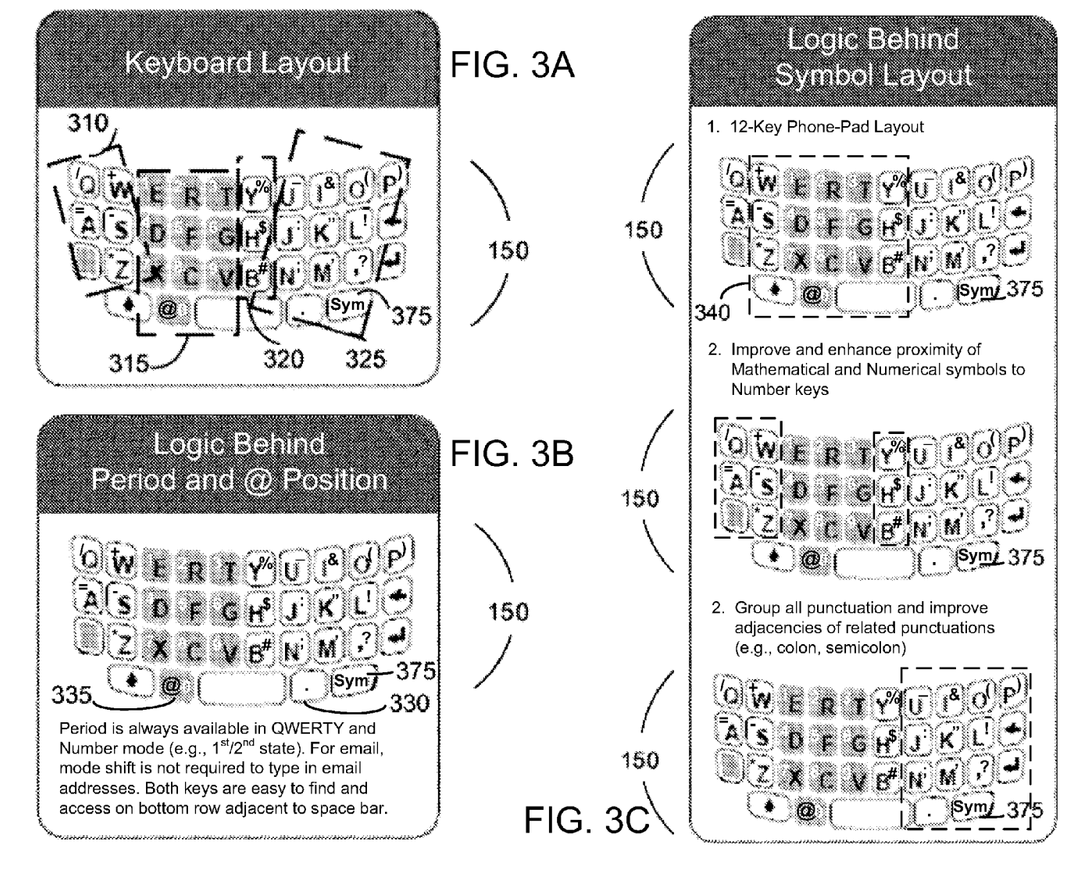
FIGS. 3A through 3C illustrate one embodiment for a mobile computing device keyboard configuration and corresponding logic for the keyboard configuration.

FIGS. 3A through 3C illustrate one embodiment for a keyboard configuration and corresponding logic for configuration of keys of the keyboard. For ease of discussion, the illustrated keyboard will be described in the context of the keyboard 150 of the mobile computing device 110. Turning first to FIG. 3A, illustrated is a layout of the keyboard 150. In this embodiment there are 35 keys in four rows. There are three rows of keys (e.g., along a 'y' axis) in which there are ten keys in each row along a substantially horizontal line (e.g., along an 'x' axis). The fourth row of keys includes five keys. The first three rows include keys in which the primary character values are the letters of the English alphabet in a conventional "QWERTY" layout. Also included in these first three rows are keys that have a primary character value of a backspace, a ',' and an enter. The fourth row of keys includes keys with a primary character value of a shift key, a spacebar, and a "SYM" (or symbol) key 375.

The 35 keys of the keyboard 150 also include keys having a secondary character value. The keys having the secondary character values are logically grouped to maximize efficiency of interaction. This logic is further illustrated and described through FIGS. 3A, 3B and 3C. First, in FIG. 3A, the keys of the keyboard 150 are illustrated to have the secondary character values in four groupings (or zones) 310, 315, 320, 325. The four groupings in this exemplary embodiment include a mathematical grouping 310 (e.g., '+', '−', '*', '/', '='), a numeric key (number mode) grouping 315 (e.g., numbers '1' to '9' and '0' in a keypad layout), a symbolic operand grouping (e.g., '%', '$', '#'), and a punctuation grouping ('_', '&', '(', ')', ':', ';', '"', '!', '"', '?', '.' (but not 'Sym')). Each grouping of keys is aligned in blocks of adjacent keys to keep the overall functional role of the keys within proximity to each other.

In addition, FIG. 3B illustrates additional logical grouping that overlays the grouping previously described. Specifically, there is a dedicated period ('.') key 330 that is available in a first state (or primary character state), e.g., the 'QWERTY' key operation state, and a second state (or secondary character state), e.g., the numeric keypad. In addition, the primary character key corresponding to '@' 335 provides for ready access to a commonly used symbol ('@') for many electronic communications, e.g., electronic mail. This configuration reduces the number of additional steps necessary to select such character when in an electronic mail communication mode. Both the period ('.') key and the '@' key are adjacent to a space bar and can be rapidly reached on keyboard form factors that often are interacted with using single digits of a user hand, e.g., thumbs.

Continuing with FIG. 3C, the figure illustrates yet additional logic in the key configuration of the keyboard 150 layout. Within the three views of FIG. 3c (1, 2, 3), the first view illustrates a compact keypad layout that is particularly well suited for use as a telephone keypad in configuration in which the mobile computing device 110 provides telephonic functionality. In addition to the grouping of the 10 number keys in a keypad, additional keys from adjacent groupings can be added, e.g., the '*' key from the mathematical grouping 310 and the '#' key from the symbolic operand grouping 320. It is noted that this grouping can be yet another grouping 340 when the mobile computing device 110 is configured to function in a particular mode, e.g., telephonic mode (or operation) of the mobile computing device 110.

In addition, the second view illustrates that the groupings of the secondary character value of the keys enhances proximity of mathematical and numerical symbols relative to the numeric key grouping 315. For example, mathematical operand grouping 310 is immediately adjacent to the numeric key grouping 315 and symbolic operands grouping 320 often used in mathematical operations or operations using numbers also are immediately adjacent to the numeric key grouping 315.

In the third view illustrates the punctuation grouping 325. The punctuation grouping 325 includes not only a grouping of most commonly used punctuation characters, but within the grouping particular punctuations are also grouped (subgroup). For example, there is a subgroup of adjacent keys that are '(' and ')', ';' and ':' '"' and ''', '!' and '?'. The grouping of punctuation keys in this manner allows for rapid and efficient utilization of such keys in operations such as electronic mail or messaging.

It is noted that a physical characteristic of the keys of the keyboard 150 that correspond to each grouping, e.g., 310, 315, 320, 325, can be distinct with respect to one or more other groupings. For example, the grouping corresponding to the numerical values 315 can be physically distinct from the other keys in terms of color and/or texture. Likewise, each grouping of keys may be physically distinct from the other groupings in terms of color (e.g., grey, blue, white, and green) and/or texture (e.g., bumps, hatches, smooth, wave).

Gradual Key Configuration

Figure 4:
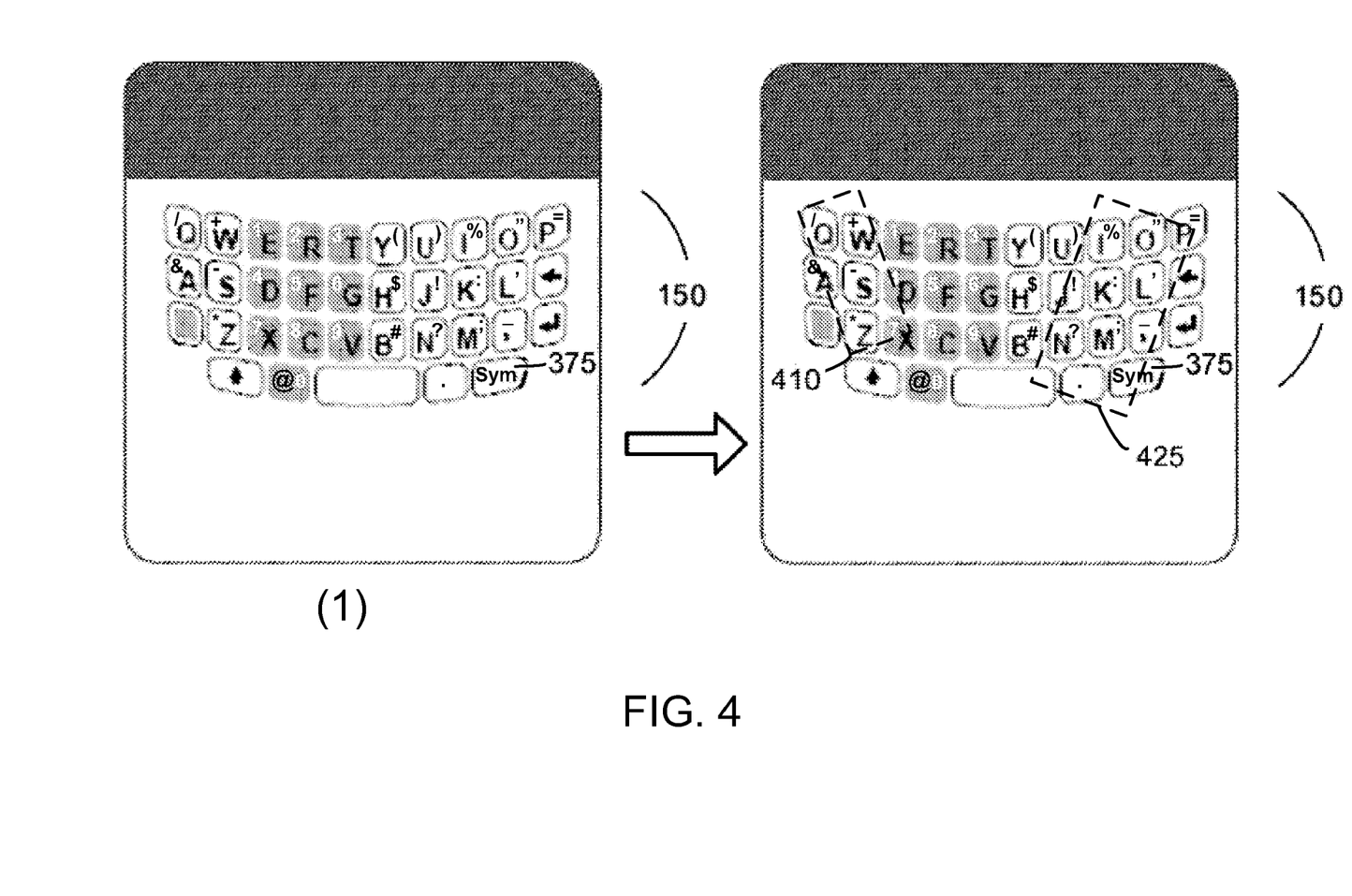
FIG. 4 illustrates an alternate embodiment for a mobile computing device keyboard configuration with more gradual secondary key configuration.

The configuration of secondary keys within the limited number of keys of the keyboard 150 is vastly different from conventional configurations. Hence, users may be confused by such changes if made all at once. To help ease the transition, in one embodiment the groupings of secondary character values on keys may be gradually introduced within the keyboard 150. To that extent, FIG. 4 illustrates an alternate embodiment for the keyboard 150 of the mobile computing device 110. Specifically, the illustration (1) shows moved keys and (2) shows the resulting configuration. In the example illustrated configuration shown is movement of the '@' and '.' character symbol towards the space bar due to the frequency of their use, for example, in electronic messaging type applications such as electronic mail. In addition, there is further consolidation of groupings. For example, a mathematics grouping 410 begins to consolidate the '/', '+', '−', and '*' mathematical functions. Similarly, a punctuation grouping 425, places the ';' punctuation mark in closer proximity to the ':', '!', '?'. '"' Subsequently, the other keys such as '=' can be moved as shown in FIGS. 3A-3C.

The disclosed embodiments beneficially allow for rapid interaction of a large number of characters directly on a keyboard without having to location special characters on a screen. Moreover, by grouping commonly used or related sets of characters that are secondary character values associated with a key users can increase their efficiency of interacting with keyboards, particularly those with limited physical space.

Another benefit of the groupings in FIGS. 3A-3C and FIG. 4 is that the groupings can be structures to match the placement of hands and finger/thumbs relative to the keyboard. For example, in looking at FIG. 3A and FIG. 4, it is noted that the grouping are at angles pushing outward from a bottom center (e.g., by the spacebar) toward the upper outer corners (e.g., outward from the 'Q' and 'P' keys). Such angles match a placement of hands and fingers/thumbs relative to a keyboard, for example, on a mobile computing device 110. This eases strain on the hands and fingers/thumbs when typing on such devices.

It is noted that some portions of above description describe the embodiments in terms of algorithms and symbolic representations of operations on information, for example, with respect to recognition by the processor 220 of the signal from the symbol toggle 232. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a keyboard with key groupings through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A keyboard on a mobile computing device, the keyboard comprising:
   a plurality of keys having a first character value and a second character value, the plurality of keys configured in a layout in which a row of keys of the plurality of keys includes consecutive characters corresponding to the first character value of 'Q', 'W', 'E', 'R', 'T', and 'Y', and the second character values corresponding to one of a plurality of groupings, the groupings including mathematical functions, punctuation functions, and numerical values, each grouping of the plurality of groupings comprising adjacent keys of the plurality of keys; and
   a symbol key, the symbol key configured to toggle the plurality of keys to correspond to the second character value on each key having a first character value and a second character value, the symbol key further configured to have a plurality of states, a first state corresponding to a single-time selection of the second character value of a key having the first character value and the second character value and a second state corresponding to successive selection of the second character value of keys having the first character value and the second character value.

2. The keyboard on a mobile computing device of claim 1, wherein the numerical values grouping of the plurality of groupings comprises a telephone dial pad.

3. The keyboard on a mobile computing device of claim 1, wherein the mathematical functions grouping of the plurality of groupings comprises the symbols '+', '−', '/', '*', and '='.

4. The keyboard on a mobile computing device of claim 1, wherein each of the grouping of mathematical functions and a grouping of symbolic operands is directly adjacent to the grouping of numerical values.

5. The keyboard on a mobile computing device of claim 1, wherein a physical characteristic of keys corresponding to the grouping of numerical values is distinct from a physical characteristic of keys corresponding to the grouping of mathematical functions and keys corresponding to the grouping of symbolic operands.

6. A mobile computing device comprising a keyboard, the keyboard having a configuration comprising:
   a plurality of keys having a first character value and a second character value, the plurality of keys configured in a layout in which a row of keys of the plurality of keys includes consecutive characters corresponding to the first character value of 'Q', 'W', 'E', 'R', 'T', and 'Y', and the second character values corresponding to one of a plurality of groupings, the groupings including mathematical functions, punctuation functions, and numerical values, each grouping of the plurality of groupings comprising adjacent keys of the plurality of keys; and
   a symbol key, the symbol key configured to toggle the plurality of keys to correspond to the second character value on each key having a first character value and a second character value, the symbol key further configured to have a plurality of states, a first state corresponding to a single-time selection of the second character value of a key having the first character value and the second character value and a second state corresponding to successive selection of the second character value of keys having the first character value and the second character value.

7. The mobile computing device of claim 6, wherein the keyboard comprises a QWERTY keyboard having between 30 and 35 keys inclusive.

8. The mobile computing device of claim 6, wherein the keyboard comprises a QWERTY keyboard having between 15 to 20 keys inclusive.

9. The mobile computing device of claim 6, further comprising a touch-sensitive display screen, and wherein the keyboard is displayed on the touch-sensitive display.

10. The mobile computing device of claim 6, wherein the configuration includes a space bar key.

11. The mobile computing device of claim 10, wherein the mobile computing device comprises a smartphone.

12. A keyboard having language character values, numerical values, and symbol values, the keyboard comprising:
   a plurality of keys arranged in at least four rows and at least five columns, the plurality of keys arranged in four groupings, a first grouping comprising a language character value grouping, a second grouping comprising a numerical value grouping, a first symbol value grouping corresponding to mathematical functions and a second symbol value grouping corresponding to punctuation functions, keys in each of the plurality of groupings being adjacent to one another and having at least two values from one of the four groupings; and
   a symbol key, the symbol key configured to toggle the plurality of keys to correspond to the second character value on each key having a first character value and a second character value, the symbol key further configured to have a plurality of states, a first state corresponding to a single-time selection of the second character value of a key having the first character value and the second character value and a second state corresponding to successive selection of the second character value of keys having the first character value and the second character value.

13. The keyboard of claim 12, wherein the keyboard comprises a QWERTY keyboard.

14. The keyboard of claim 13, wherein the QWERTY keyboard comprises between 30 and 35 keys inclusive.

15. The keyboard of claim 13, wherein the QWERTY keyboard comprises between 15 to 20 keys inclusive.

16. The keyboard of claim 13, wherein the keyboard includes a space bar key.

17. The keyboard of claim 12, wherein the keyboard is integrated with a mobile computing device.

18. The keyboard of claim 17, wherein the mobile computing device comprises a smartphone.

* * * * *